(12) United States Patent
Murray (10) Patent No.: US 9,211,914 B2
(45) Date of Patent: Dec. 15, 2015

(54) VEHICLE CHASSIS

(75) Inventor: Ian Gordon Murray, Puttenham (GB)

(73) Assignee: Gordon Murray Design Limited, Shalford (GB)

( * ) Notice: Subject to any disclaimer, the term of this patent is extended or adjusted under 35 U.S.C. 154(b) by 17 days.

(21) Appl. No.: 12/936,130

(22) PCT Filed: Apr. 2, 2009

(86) PCT No.: PCT/GB2009/000875
§ 371 (c)(1),
(2), (4) Date: Oct. 1, 2010

(87) PCT Pub. No.: WO2009/122178
PCT Pub. Date: Oct. 8, 2009

(65) Prior Publication Data
US 2011/0024221 A1  Feb. 3, 2011

(30) Foreign Application Priority Data

Apr. 4, 2008  (GB) .................................. 0806181.4
Aug. 4, 2008  (GB) .................................. 0814274.7

(51) Int. Cl.
*B62D 23/00*  (2006.01)
*B62D 24/00*  (2006.01)
(Continued)

(52) U.S. Cl.
CPC .......... *B62D 23/005* (2013.01); *B62D 25/2027* (2013.01); *B62D 29/008* (2013.01)

(58) Field of Classification Search
CPC ........ B62D 21/08; B62D 21/00; B62D 21/10; B62D 25/20; B62D 65/00; B62D 65/04
USPC .......................... 180/311, 312; 280/798, 781; 296/193.07, 205
See application file for complete search history.

(56) References Cited

U.S. PATENT DOCUMENTS 2,230,448 A     2/1941  Best
3,292,969 A *  12/1966  Eggert, Jr. ...................... 296/205
(Continued)

FOREIGN PATENT DOCUMENTS

DE     4142258 A1    6/1993
DE    19912173 A1    9/1999
(Continued)

OTHER PUBLICATIONS

PCT International Search Report, Aug. 25, 2009.
(Continued)

*Primary Examiner* — Karen Beck
(74) *Attorney, Agent, or Firm* — Westman, Champlin & Koehler P.A.; Z. Peter Sawicki (57) ABSTRACT

A chassis (10) for a vehicle is disclosed which combines rigidity, speed of manufacture, and a small environmental footprint. Such a chassis comprises a framework of interconnected tubular sections (12, 14, 16, 18, 20, 22, 28) and at least one sheet (50) bonded to the framework. Laser cutting, CNC bending, and computer-controlled welding mean that the required production time can be kept to 120 seconds and the rigidity of the structure as a whole is sufficient. Such a chassis also has an exceptionally low carbon footprint. The sheet can be metallic, such as Aluminium or Aluminium honeycomb, or it can be a composite material such as one comprising a paper-based core and a fibre-reinforced plastics coating. The sheet can be non-flat, and is preferably a concave geometry such as a tub. It can be composed of a plurality of sections, ideally joined by a method allowing a positional tolerance so that any tolerance in the construction of the framework can be accommodated. A corresponding method of manufacturing a chassis is also disclosed.

19 Claims, 14 Drawing Sheets

(51) Int. Cl.
   *B62D 25/20* (2006.01)
   *B62D 29/00* (2006.01)

(56) References Cited

U.S. PATENT DOCUMENTS

| | | | |
|---|---|---|---|
| 3,550,948 A * | 12/1970 | Thompson, Jr. | 296/181.2 |
| 4,045,075 A | 8/1977 | Pulver | |
| 4,422,685 A * | 12/1983 | Bonfilio et al. | 296/193.04 |
| 4,453,763 A * | 6/1984 | Richards | 296/181.2 |
| 4,584,225 A * | 4/1986 | Adelman | 428/71 |
| 4,618,163 A | 10/1986 | Hasler et al. | |
| 4,660,345 A * | 4/1987 | Browning | 52/653.2 |
| 4,799,708 A | 1/1989 | Handa et al. | |
| 4,832,399 A | 5/1989 | Kosuge | |
| 4,869,539 A * | 9/1989 | Cassese | 280/781 |
| 4,898,419 A * | 2/1990 | Kenmochi et al. | 296/204 |
| 4,930,809 A * | 6/1990 | Lindsay | 280/789 |
| 5,020,846 A | 6/1991 | Bonnett | |
| 5,129,700 A | 7/1992 | Trevisan et al. | |
| 5,517,894 A * | 5/1996 | Bohne et al. | 89/36.02 |
| 5,619,784 A * | 4/1997 | Nishimoto et al. | 29/430 |
| 5,720,511 A | 2/1998 | Benedyk | |
| 5,735,568 A | 4/1998 | Arnold | |
| 5,819,408 A * | 10/1998 | Catlin | 29/897.2 |
| 6,250,410 B1 | 6/2001 | Balestrini et al. | |
| 6,260,913 B1 | 7/2001 | Sekita et al. | |
| 7,004,533 B2 * | 2/2006 | Arthur et al. | 296/190.08 |
| 7,350,853 B2 * | 4/2008 | Fitze | 296/193.07 |
| 2002/0070572 A1 | 6/2002 | Stol et al. | |
| 2002/0074829 A1 | 6/2002 | Hoppenstein | |
| 2004/0119276 A1 * | 6/2004 | Fior et al. | 280/781 |
| 2005/0104356 A1 * | 5/2005 | Vincenti | 280/795 |
| 2009/0188100 A1 * | 7/2009 | Durney et al. | 29/469 |

FOREIGN PATENT DOCUMENTS

| | | |
|---|---|---|
| DE | 19908833 A1 | 9/2000 |
| DE | 10210615 A1 | 10/2003 |
| EP | 0217522 A1 | 4/1987 |
| EP | 0298903 A2 | 1/1989 |
| EP | 0349306 A2 | 1/1990 |
| EP | 0433903 A1 | 6/1991 |
| EP | 0541485 A | 5/1993 |
| EP | 0930221 A2 | 7/1999 |
| FR | 2596350 A1 | 10/1987 |
| FR | 2687974 A1 | 9/1993 |
| GB | 142604 A | 5/1920 |
| JP | 61172609 | 10/1986 |
| JP | H02-77366 | 3/1990 |
| JP | H02-296577 | 12/1990 |
| JP | H08164753 | 6/1996 |
| JP | H09-142194 | 6/1997 |
| JP | 10045027 A | 2/1998 |
| JP | 63106184 A | 5/1998 |
| JP | H10-138955 | 5/1998 |
| JP | 2001520147 | 10/2001 |
| JP | 2001520601 | 10/2001 |
| JP | 2003267271 | 9/2003 |
| JP | 2005527421 | 9/2005 |
| JP | 2006518306 | 8/2006 |
| WO | 0033997 A | 6/2000 |
| WO | 0234610 A1 | 5/2002 |
| WO | 02070322 A1 | 9/2002 |
| WO | 04000633 A1 | 12/2003 |
| WO | 2005025970 A | 3/2005 |
| WO | 2005025970 A1 | 3/2005 |
| WO | 2005030562 A | 4/2005 |

OTHER PUBLICATIONS

JP Office Action; 2011-502429; Jul. 9, 2013 (English Translation).
GB Search Report; Application No. GB0806181.4; Jul. 4, 2008.
Combined Search and Examination Report; Application No. GB0814274.7; Sep. 9, 2008.
Extended European Search Report; Application No. 12197701.1-1503; Mar. 7, 2013.
European Examination Report for EP12197701.1; dated Jan. 17, 2014.

* cited by examiner

VEHICLE CHASSIS

CROSS-REFERENCE TO RELATED APPLICATION

This Application is a Section 371 National Stage Application of International Application No. PCT/GB2009/000875, filed Apr. 2, 2009 and published as WO 2009/122178 A1 on Oct. 8, 2009, the content of which is hereby incorporated by reference in its entirety.

FIELD OF THE INVENTION

The present invention provides a vehicle chassis.

BACKGROUND OF THE INVENTION

It hardly needs to be said that the chassis is a crucial component of a vehicle. It is the core of the vehicle, from which all other components are supported either directly or indirectly. It is ultimately responsible for absorbing and transmitting the forces experienced by the vehicle; its rigidity determines (to a large extent) the handling behaviour of the vehicle and its deformation behaviour is a major factor in the crashworthiness of the vehicle.

It is also the largest single component of the vehicle and (aside from the engine, in some cases) the heaviest. This means that the resources needed to construct the chassis and its eventual weight will be a significant part of the lifecycle environmental footprint of the vehicle.

Reduction of the weight and material requirements of the chassis will therefore lead to benefits in the performance, fuel economy and environmental footprint of the vehicle. However, this must be done without adversely affecting the necessary rigidity of the chassis.

Historically, a simple ladder chassis was constructed, using two longitudinal sections joined by crossmembers that (in effect) provided the "rungs" of the ladder. The longitudinal sections needed to be of a very large gauge in order to provide the necessary strength. This resulted in a chassis that, by today's standards, is too heavy and insufficiently rigid in torsion. It was, however, very straightforward to mass-produce.

The use of additional longitudinal sections joined by multiple crossmembers or bulkheads creates what is usually referred to as a tubular frame chassis. For mass-produced vehicles, these have however been dismissed as the time required for manufacture is generally too great.

Whilst the rigidity of such a structure is greater than that of a ladder chassis, in order to provide sufficient rigidity it is generally necessary to add additional diagonal members to the structure so that torsional moments are avoided and all forces are taken up by way of longitudinal tension or compression of a frame member. A structure of this type is usually referred to as a space frame, and is far too complex for mass production.

Modern volume-produced vehicles therefore universally use a pressed steel chassis. The chassis is formed by a pressing/stamping operation involving one or more steps. This produces a steel chassis which has the necessary rigidity but which is very heavy and requires very substantial tooling for its production. The remaining necessary parts of the vehicle structure are then spot-welded to the assembly.

The tools required to form the chassis are physically large, and must therefore be housed in a large facility. A substantial material cost (with attendant environmental footprint) is therefore involved in the chassis, the tools and the facility, the weight of the resulting chassis imposes a substantial ongoing environmental footprint as a result of the consequential energy requirements of the vehicle, and the large facility imposes a corresponding ongoing environmental footprint in terms of its heating, its lighting, its maintenance and so on. The necessary spot-welding involves significant energy consumption.

SUMMARY OF THE INVENTION

The present invention seeks to provide a chassis for a vehicle which combines the necessary rigidity with sufficient speed of manufacture to permit volume production, but with an environmental footprint that is a fraction of that of a conventional pressed steel chassis.

A pressed steel chassis cannot meet these requirements for the reasons outlined above.

A conventional tubular frame chassis cannot meet the requirement as to speed of manufacture. For volume production, we seek a total time requirement of the order of 120 seconds per chassis; a current tubular frame chassis requires the continuous attention of a skilled operator and is therefore a very time consuming process.

We therefore propose a chassis for a vehicle, comprising a framework of interconnected tubular sections and at least one sheet bonded to the framework. Through the use of modern constructional methods such as laser cutting, CNC bending, and computer-controlled welding, the production time required for such a chassis can be kept to within our target of 120 seconds. Meanwhile, the sheet bonded to the framework acts as a structural part of the chassis and adds rigidity to the structure as a whole that enables it to meet the required degree of stiffness.

Such a chassis also has an exceptionally low carbon footprint. The use of (preferably hollow) tubular sections, which can be of a metallic material such as steel or Aluminium, is very much more economical in material usage than a pressed steel chassis and can be formed with significantly smaller tools which therefore (themselves) have a smaller footprint. The physical space required to construct such a chassis is also very much smaller, allowing a reduction in the heating, lighting, constructional and other costs and carbon footprint of the facility in which they are built.

The sheet can be metallic, such as Aluminium or Aluminium honeycomb, or it can be a composite material. Various composite materials are suitable, including carbon fibre composite, Kevlar fibre composite, glass fibre composite, and other composite materials such as metal matrix composites. An especially suitable composite material is one comprising a core of one material and a coating of a second material; suitable cores include paper-based materials and suitable coatings include fibre-reinforced plastics materials.

The sheet can be non-flat, and is preferably so since this will allow a greater degree of rigidity in a wider variety of axes. A concave geometry such as a tub is preferred. It can be composed of a plurality of sections, ideally joined by a method allowing a positional tolerance so that any tolerance in the construction of the framework can be accommodated.

The chassis defined above can of course accept an engine and other running gear, bodywork and interior fittings which will be mounted at a suitable location on or under the chassis.

The present invention further provides a vehicle comprising a chassis as defined above. Where the vehicle assembly takes place remote from the chassis construction, the chassis as defined above can be transported very much more economically due to the very high degree of rigidity that is derived notwithstanding the largely planar shape. This compact shape for the chassis that is permitted by the present invention allows a large number of chassis elements (such as 6-8) to be fitted within a single standard shipping container. Thus, the transport costs and associated environmental footprint can be significantly reduced.

The present invention also relates to a method of making a chassis for a vehicle, comprising preparing a plurality of tubular sections, cutting the sections to length, profiling the ends of the sections, bending the sections as necessary, joining the ends of at least some of the sections to other sections, placing a sheet in the framework thus created, and bonding the sheet to the framework.

The tubes can be cut by a laser cutting process, and are preferably cut and profiled in the same step. They can be bent via a CNC bending process and joined via automatic welding.

BRIEF DESCRIPTION OF THE DRAWINGS

An embodiment of the present invention will now be described by way of example, with reference to the accompanying figures in which.

DETAILED DESCRIPTION OF ILLUSTRATIVE EMBODIMENTS

FIGS. 1, 2, 3 and 4 show a tubular frame construction used in the manufacture of vehicle chassis according to the present invention. The frame structure 10 comprises a series of 4 longitudinal members, two members 12, 14 on a left hand side of the vehicle and two members 16, 18 on a right hand side of the vehicle. The members on each respective side are connected via various riser elements 20, 22 and by the lower longitudinal member 14, 18 of the two rising towards the rear of the car so as to meet the corresponding upper member 12, 16. This rising profile also creates a space 24 at the rear of the car to accommodate the rear running gear. Likewise, at the front of the car all four longitudinal members include bends so as to divert them inwardly towards the centre line of the car and create a space 26 for the front running gear.

To hold the longitudinal members 12, 14, 16, 18 at the correct spacing, cross members such as that shown at 28 are provided, attached to the longitudinal members and extending transversely across the vehicle. Thus, a tubular frame structure is obtained.

These tubes are large diameter steel (or aluminium) thin wall tube which is cut and bent by CNC (computer numeric control) processes. The ends of the tube can currently be profiled by CNC laser apparatus followed by CNC bending and robotic welding. As a result, the steel structure of the chassis can be built up from sections of tubing, which are themselves obtained from elongate narrow steel strip. That is intrinsically straightforward to produce, bend and weld into a steel tube form, as opposed to a conventional pressed steel chassis which requires a single large steel billet to be forged into the necessary shape. The wastage of material and the energy required to form and assemble the tubular frame is therefore very much less than the equivalent steel pressing.

The multi-tubular structure created in this way is largely self-jigging, therefore requiring minimal additional parts for construction. Once the structure has been welded together, external and internal protection for the exposed steel can be applied via a suitable chemical bath.

The chassis illustrated herein by way of example is intended for use in relation to a three-seater personal transport vehicle as illustrated in (for example) our earlier patent application number PCT/GB08/000892. Accordingly, the structure provides footwell areas 30, 32 for the two rear passengers and a seating area 34 for the centrally positioned driver. However, other vehicle designs and layouts could be catered for in the design.

Figure 1:
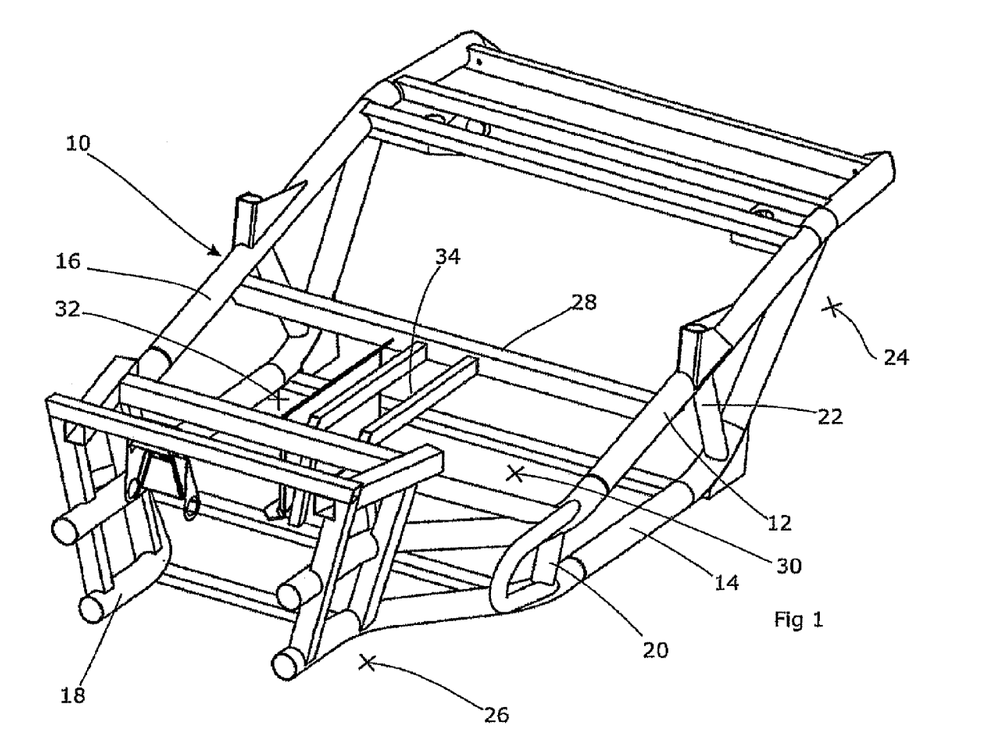
FIGS. 1 to 4 show perspective, plan, side and front views respectively of the tubular frame prior to fitting the sheet.
Figure 2:
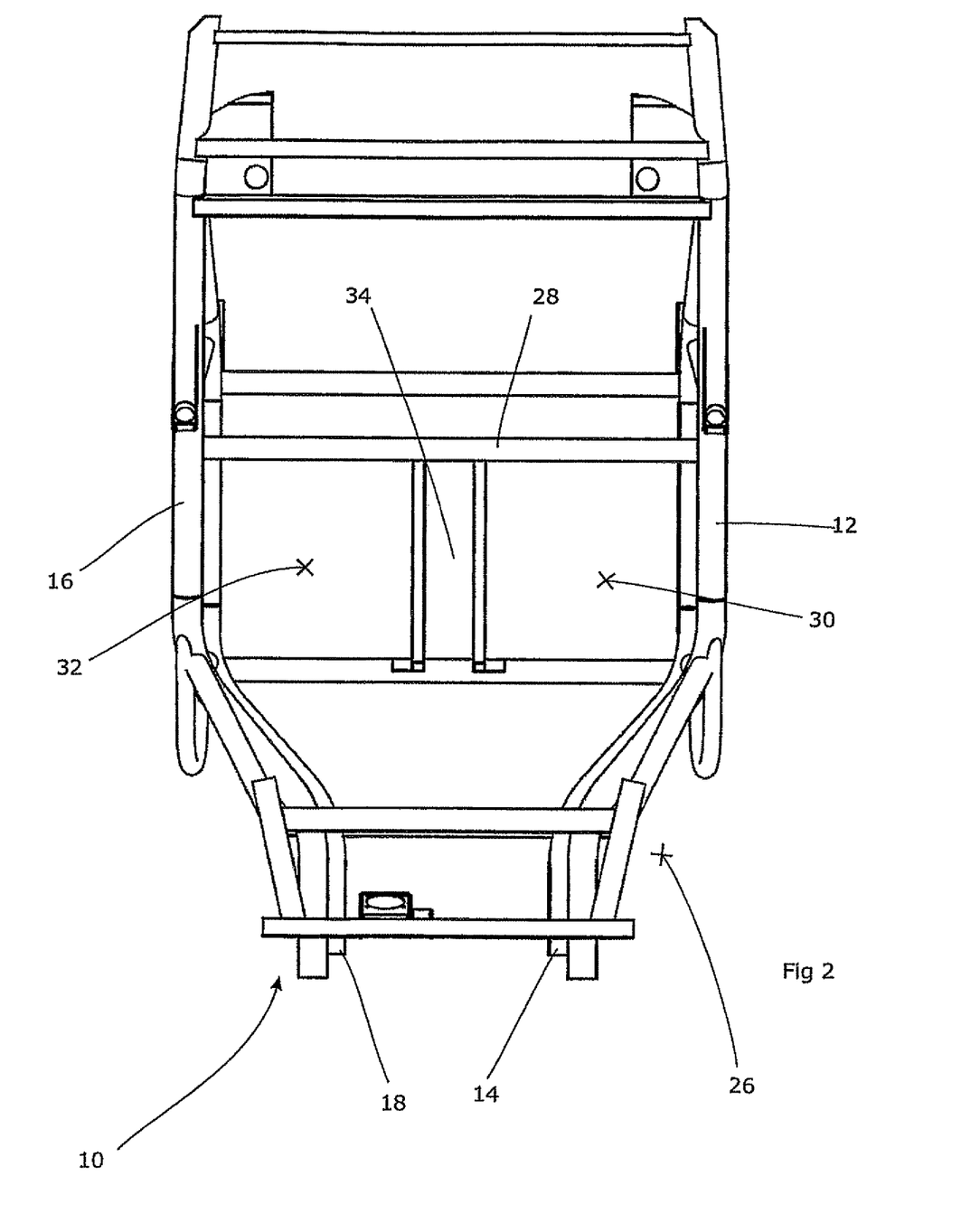
Figure 3:
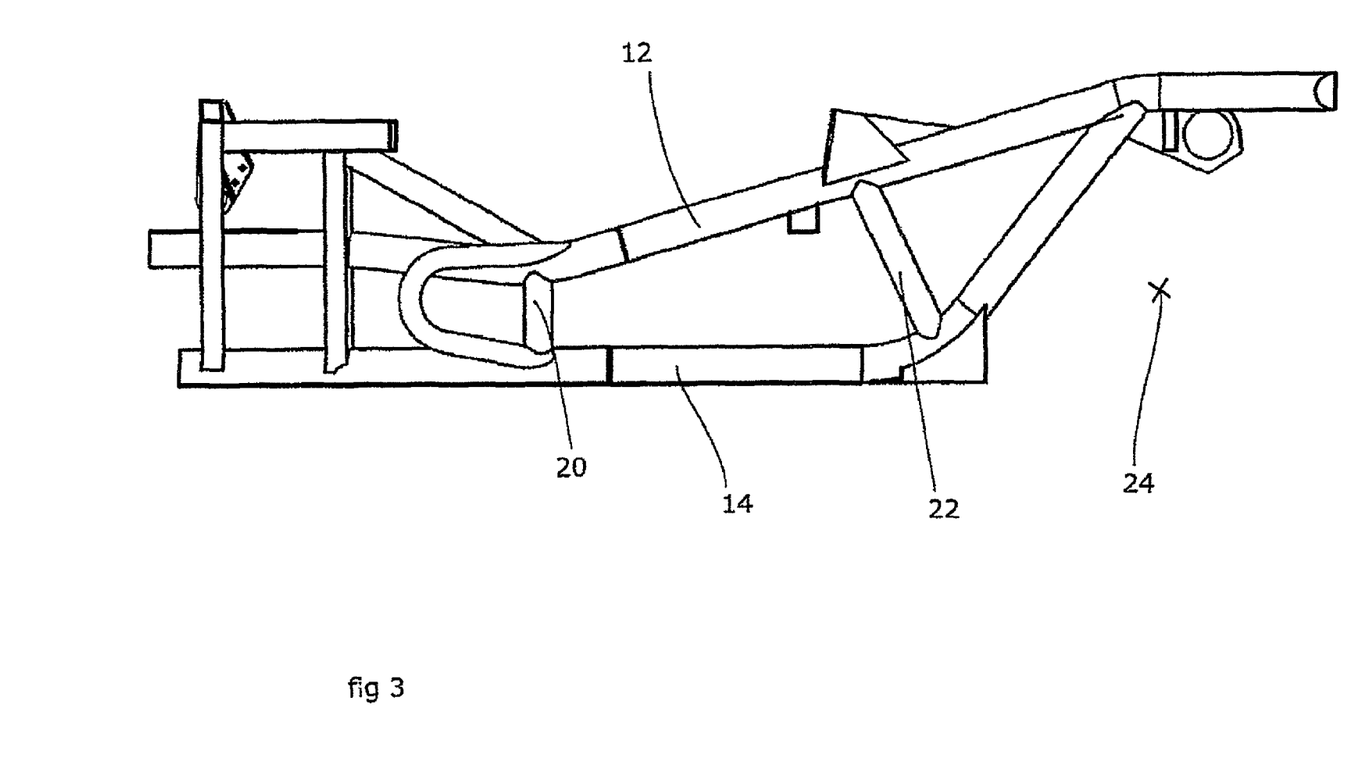
Figure 4:
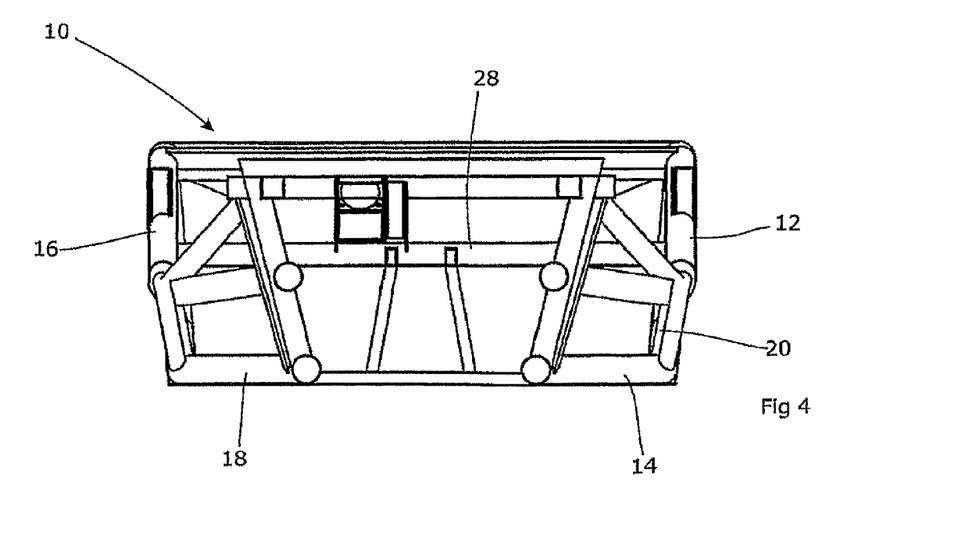
Figure 5:
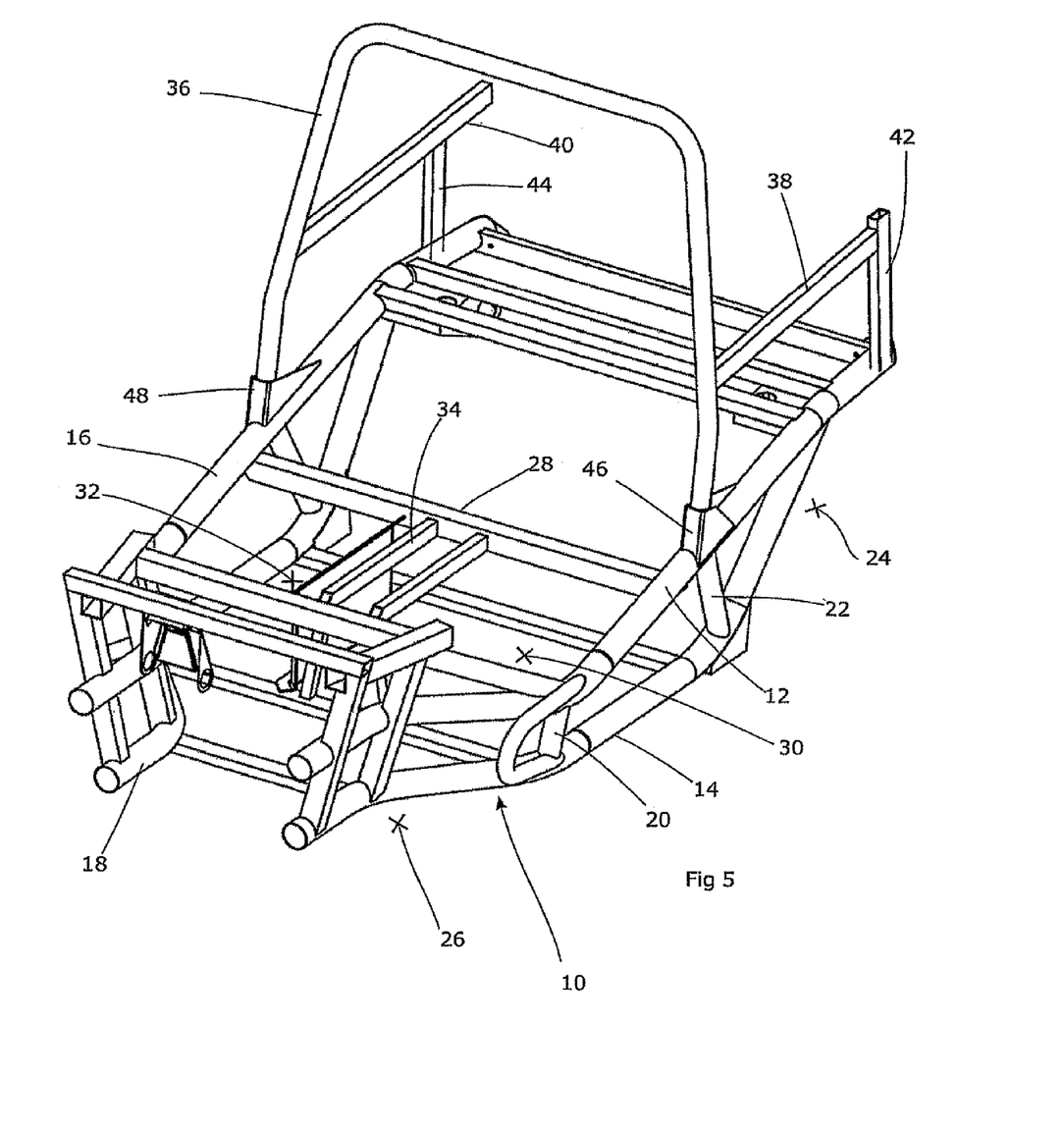
FIGS. 5 to 8 show perspective, plan, side and front views respectively of the tubular frame prior to fitting the sheet, with a roll bar fitted.
Figure 6:
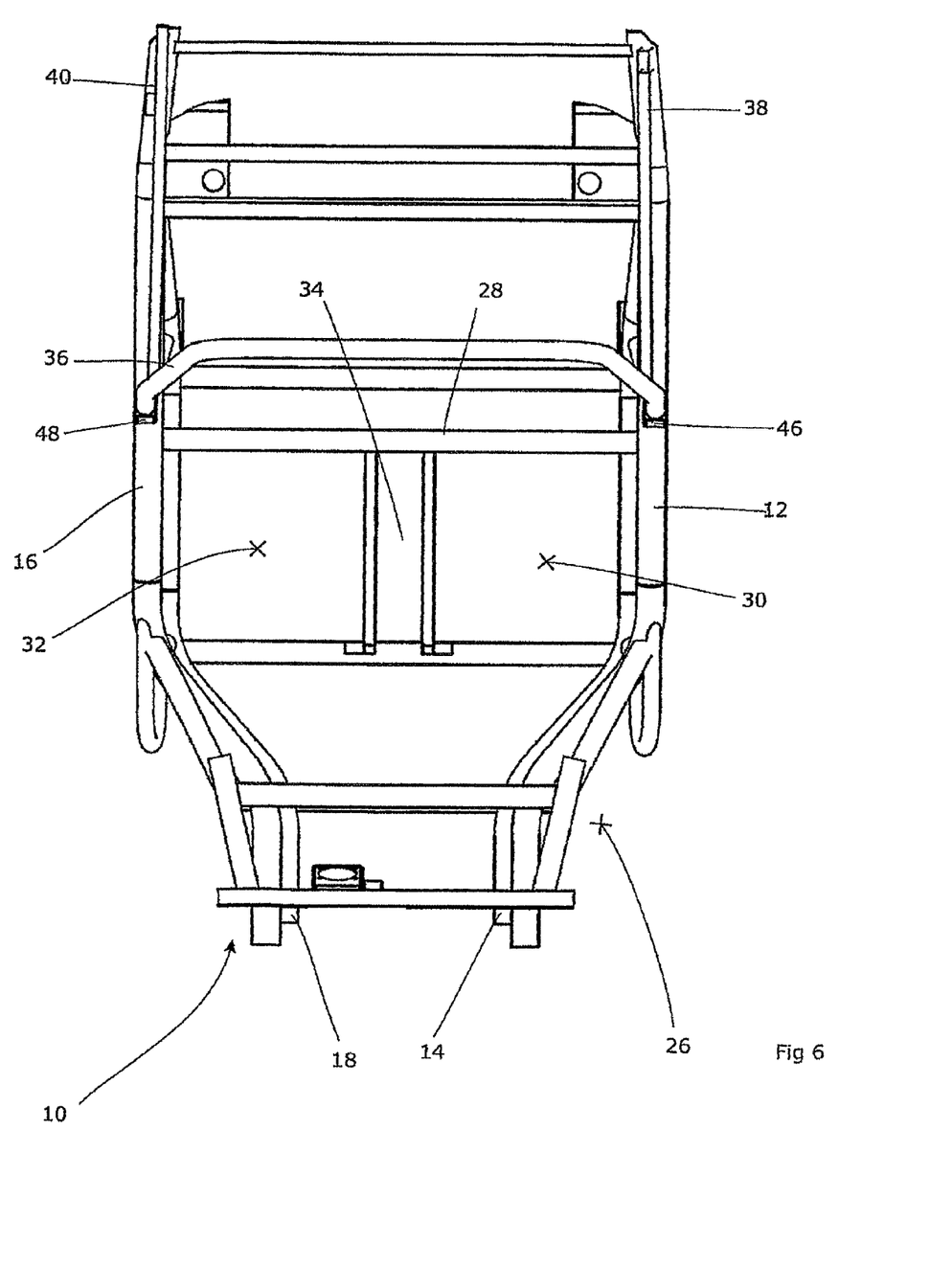
Figure 7:
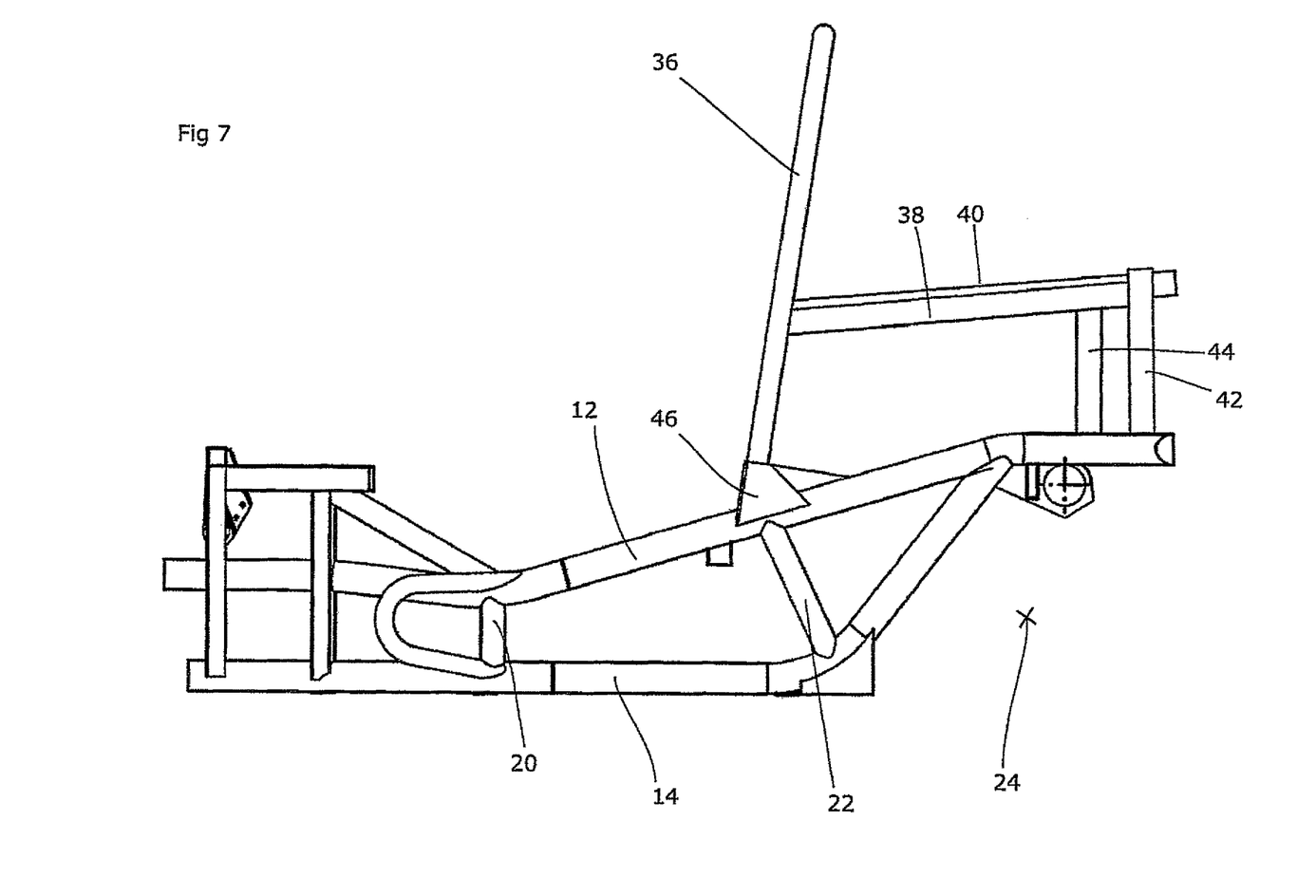
Figure 8:
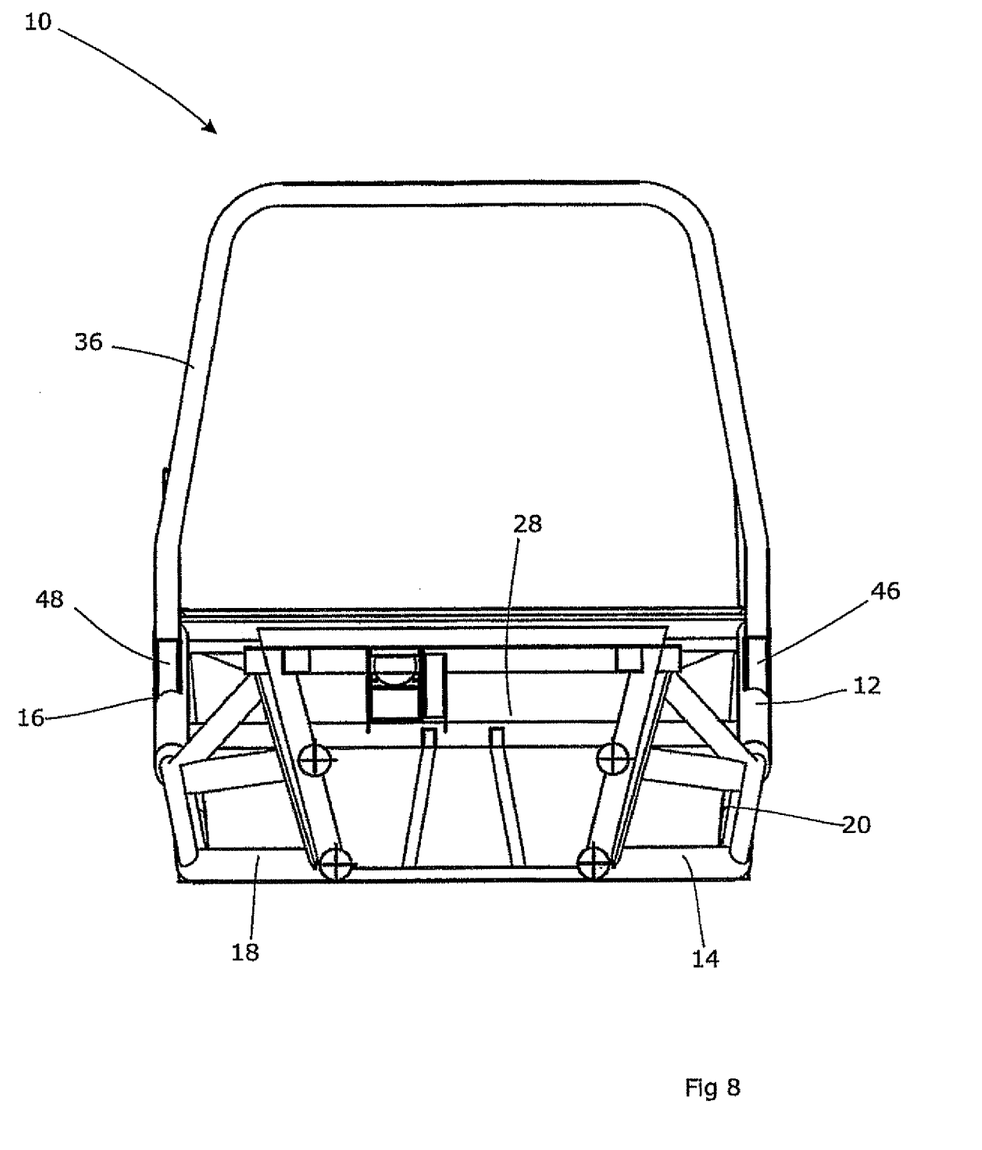
Figure 9:
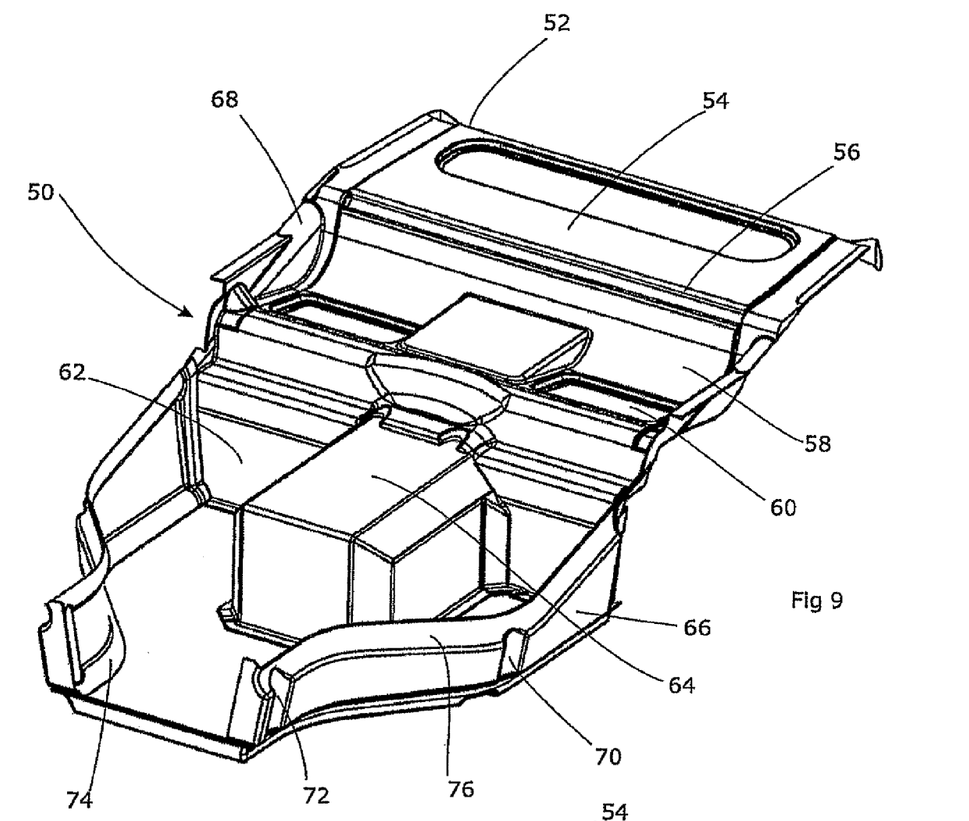
FIGS. 9 to 12 show perspective, plan, side and front views respectively of the sheet prior to fitting to the tubular frame.
Figure 10:
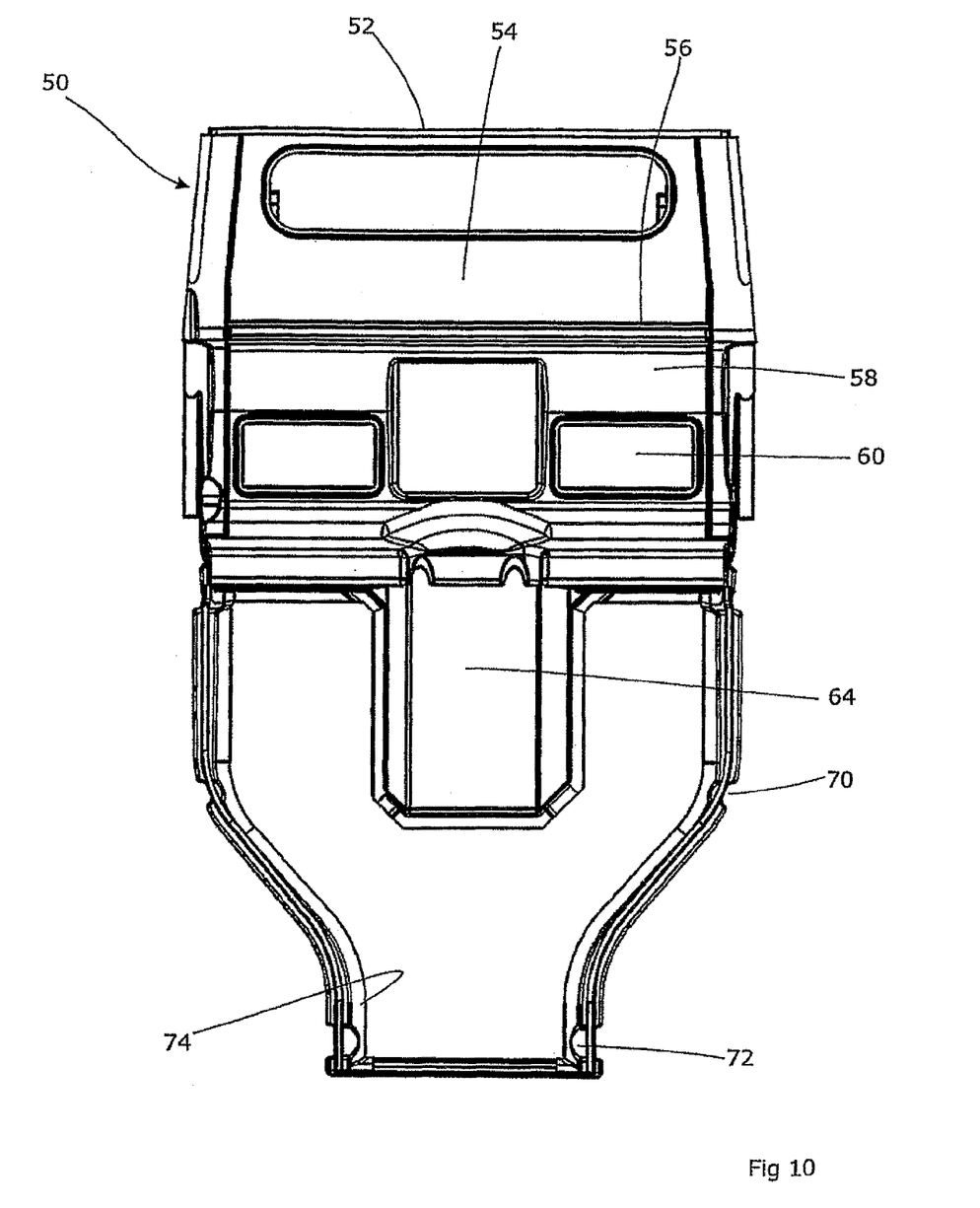
Figure 11:
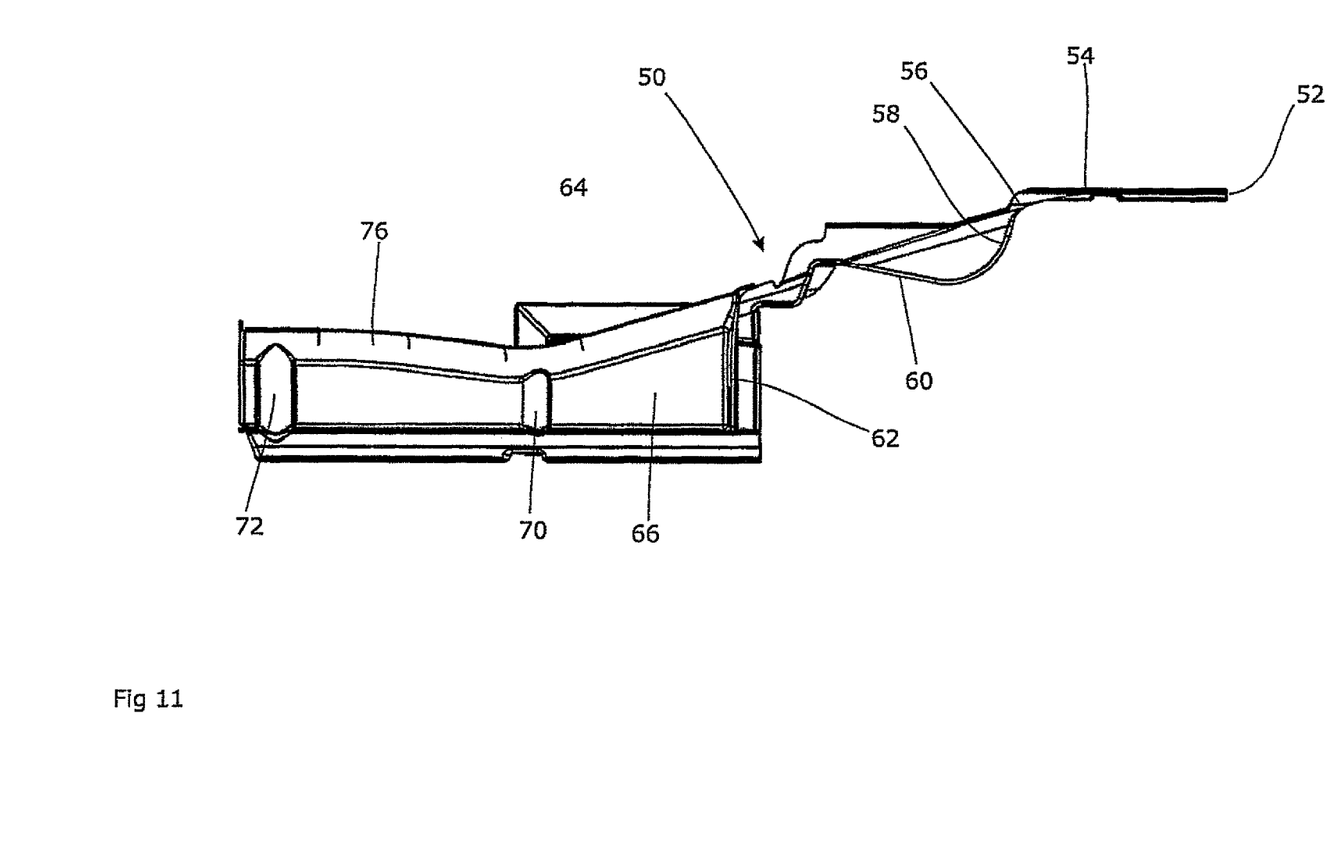
Figure 12:
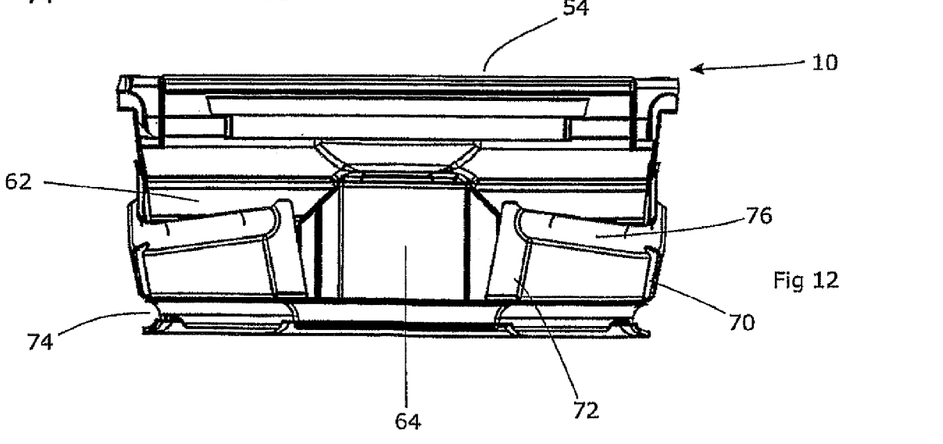
Figure 13:
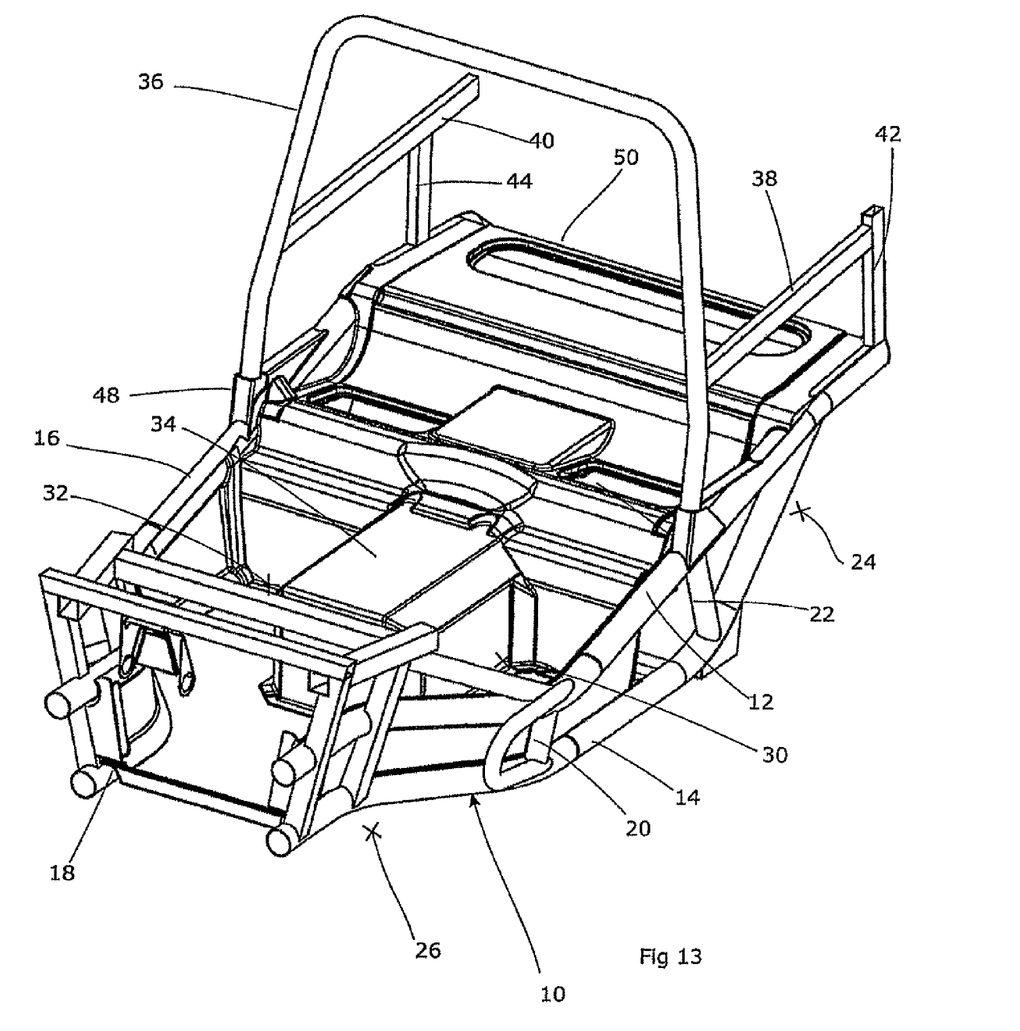
FIGS. 13 to 16 show perspective, plan, side and front views respectively of the tubular frame fitted with the sheet.
Figure 14:
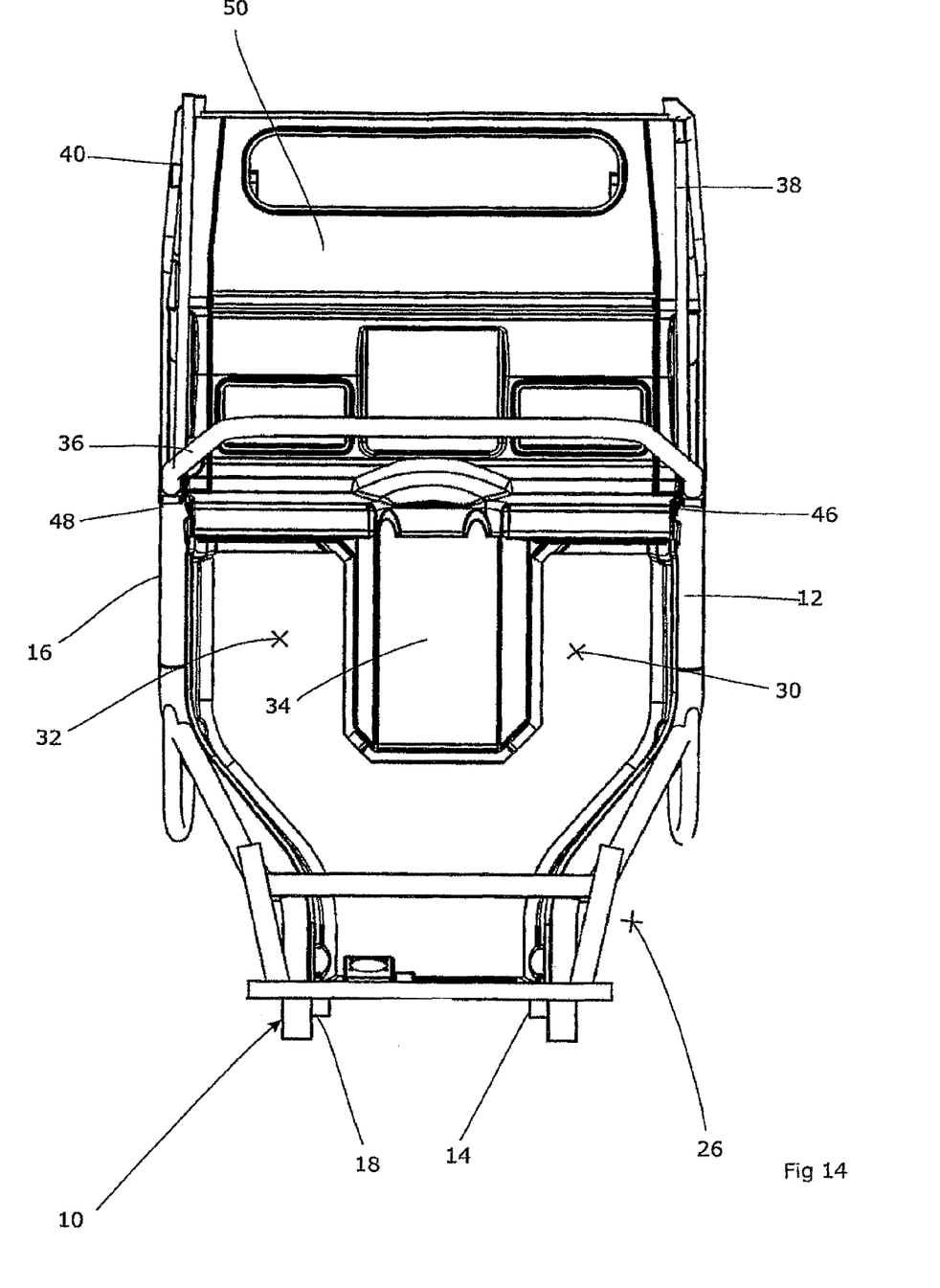
Figure 15:
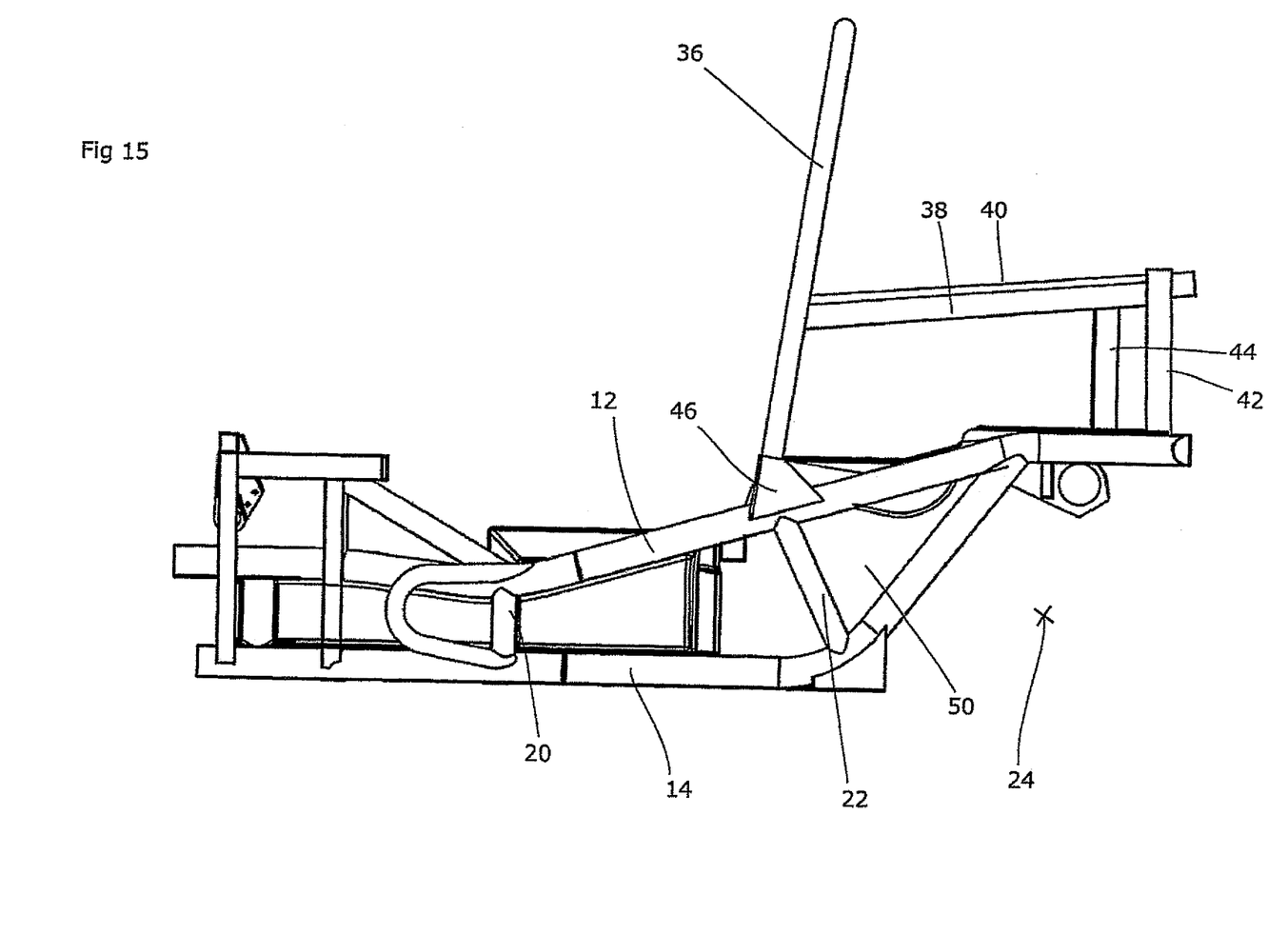
Figure 16:
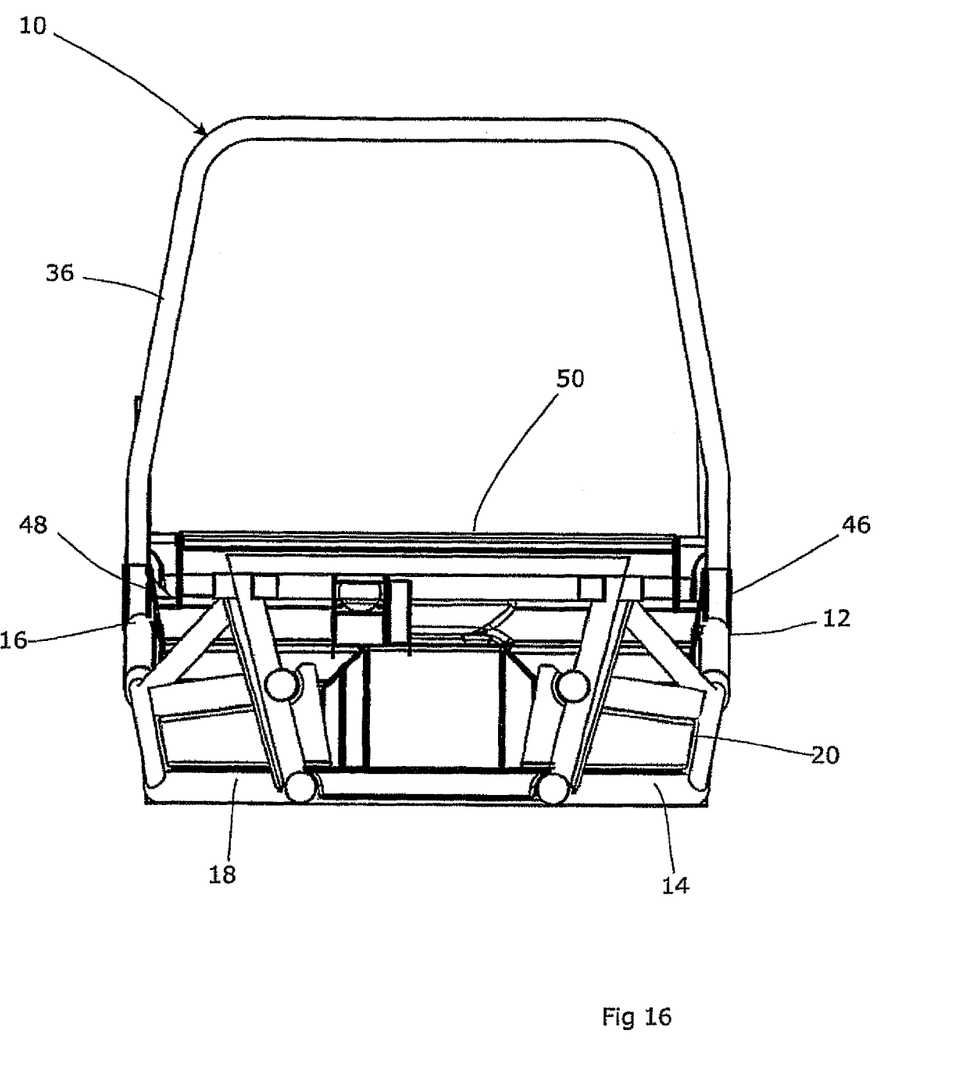

FIGS. 1-3 show an initial state of the construction in which the lower half of the vehicle chassis is provided, offering the basic elements of a load path that offers predictable crash management, greater rigidity and bending stiffness. However, even when compared to the final dimensions of this vehicle, the resulting chassis is extremely compact and it can be packaged into a standard shipping container (without side walls or a roof section attached) with very much greater efficiency than a conventional pressed steel and spot-welded chassis. This means that the chassis and body can be manufactured on separate sites with assembly taking place at either site or a third site, and also means that very many more chassis can be transported in a standard shipping container relative to a standard small car, thereby reducing shipping costs and the $CO_2$ emissions associated therewith. This is made possible by the multi-tubular structure, assembly of which can be suspended at an intermediate but stable state such as that shown in FIGS. 1-4, as opposed to a pressed steel structure.

FIGS. 5-8 show the multi-tubular structure 10 in FIGS. 1-4 to which a steel roll hoop 36 has been added. A pair of upper longitudinal members 38, 40 extend rearwardly from the roll hoop 36 and thus supported by struts 42, 44. The roll hoop 36 is accommodated within a pair of sockets 46, 48 that had previously been welded onto the longitudinal members 12, 16; this offers a secure location for the roll hoop 36. Side members 38, 40 extend rearwardly from the roll hoop and provide a means of mounting the rear body panels. To this complete tubular frame structure, a rigid sheet 50 is then added, this being shown in FIGS. 9-14.

The rigid sheet 50 has two main purposes. One is to reinforce the multitubular structure by transmitting loads between the tubular members, thereby increasing the rigidity of the structure as a whole and improving its crashworthiness. To this end, the sheet is made of a suitable rigid material such as steel, aluminium, aluminium honeycomb, and composite materials. As noted above, various composite materials are suitable including carbon fibre composite, Kevlar fibre composite, glass fibre composite, and other composite materials such as metal matrix composites. An especially suitable composite material is one comprising a core of one material and a coating of a second material; suitable cores include paper-based materials and suitable coatings include fibre-reinforced plastics materials.

It may be necessary to adjust the material selection depending on the intended national market of the vehicle. For example, vehicles for the Western European market could be provided with a paper-cored composite material in order to minimise the environmental impact of manufacture, whilst vehicles intended for warm humid climates such as Southeast Asia could be provided with a thermoplastic core to provide sufficient longevity.

In support of its reinforcement task, the sheet is also formed into a non-flat shape so that it can offer rigidity against torsion. A flat sheet obviously only offers a high torsional rigidity about one axis, whereas a sheet with compound bends (i.e. bends in more than one non-parallel axis) can offer rigidity in substantially all dimensions.

The secondary purpose of the sheet 50 is to provide an internal structure to the vehicle, covering the apertures between tubular members. Thus, the sheet is moulded according to a compound shape that is convenient for the intended layout of the vehicle. Starting from the rear 52 of the vehicle, there is a flat panel 54 which acts as a parcel shelf or (in this case) as the floor of a load area over a rear-mounted engine compartment, then a downward curve 56 to provide an inclined seat backrest 58 for the rear seat passengers. After curving upwards again to provide the rear seat squabs 60, the outer parts of the sheet 50 then curves downward to provide the footwells 62 for the rear seat passengers. A central part extends forward as a ridge formation 64 to support a centrally mounted driver's seat; this, together with upright side panels 66 either side of the footwell 62 and side panels 68 either side of the rear seats 58 provides a three-dimensional compound curvature to the sheet 50.

Recesses are formed in the sheet 50 at locations 70, 72, 74, 76 that correspond to tubular sections in the framework 10. These allow the sheet 50 to follow and conform to the shape of parts of the framework 10 and be bonded to it, for example via a suitable engineering adhesive such as an epoxy resin. This permits forces to be transferred between the framework 10 and the sheet 50, thereby allowing the sheet 50 to contribute to the rigidity and crashworthiness of the chassis.

FIGS. 13 to 16 show the sheet 50 installed in and bonded to the framework 10 to form the complete chassis, to which the roll hoop 36 has been attached. The recesses 70, 72, 74, 76 in the sheet 50 now curve around a tube of the framework 10 and have been bonded to the relevant tube so that the sheet 50 and framework 10 form a single loadbearing structure to which the engine, running gear, internal and external trim etc can be fitted.

It will of course be understood that many variations may be made to the above-described embodiment without departing from the scope of the present invention.

Although the present invention has been described with reference to preferred embodiments, workers skilled in the art will recognize that changes may be made in form and detail without departing from the spirit and scope of the invention.

The invention claimed is:

1. A chassis for a vehicle, comprising;
   a framework of interconnected tubular sections having longitudinal members joined by cross-members, including at least one longitudinal member from which at least one cross-member extends in a first direction towards a second longitudinal member and at least one further cross-member extends in a second direction that is non-parallel to the first direction towards a third longitudinal member, thereby to define a three-dimensional structure; and
   at least one sheet which includes a concave section that extends into the framework wherein the at least one sheet has curved recesses formed to correspond to, follow and conform to the shape of the tubular sections in the framework, and which are bonded with an adhesive to the longitudinal members of the tubular structure so that the recesses each curve around a tubular section to which the recess is bonded to act as a structural part of the chassis, to add rigidity thereto and to form a complete chassis.

2. The chassis according to claim 1 in which the tubular sections are metallic.

3. The chassis according to claim 1 in which the tubular sections are steel.

4. The chassis according to claim 1 in which the tubular sections are Aluminium.

5. The chassis according to claim 1 in which the tubular sections are hollow.

6. The chassis according to claim 1 in which the sheet is metallic.

7. The chassis according to claim 1 in which the sheet is of Aluminium.

8. The chassis according to claim 1 in which the sheet is an Aluminium honeycomb structure.

9. The chassis according to claim 1 in which the sheet is a composite material.

10. The chassis according to claim 1 in which the sheet is a composite material comprising a core of one material and a coating of a second material.

11. The chassis according to claim 10 in which the core is paper.

12. The chassis according to claim 10 in which the coating is a fibre-reinforced plastics material.

13. The chassis according to claim 1 in which the sheet comprises a tub.

14. The chassis according to claim 1 in which the sheet is composed of a plurality of sections.

15. The chassis according to claim 14 in which the sections are joined by a method allowing a positional tolerance.

16. The chassis according to claim 1 further comprising an engine mounted thereon.

17. The chassis according to claim 16 in which the engine is mounted on an underside of the chassis.

18. A vehicle comprising a chassis according to claim 1.

19. The chassis according to claim 1 wherein the at least one sheet is bonded to at least the first, second and third longitudinal members of the tubular structure.

* * * * *